United States Patent [19]

Kohn

[11] Patent Number: 4,908,267

[45] Date of Patent: Mar. 13, 1990

[54] ULTRATHIN POLYETHER SULFONE FILMS AND THEIR PREPARATION

[75] Inventor: Rachel S. Kohn, Springfield, N.J.

[73] Assignee: Hoechst Celanese Corp., Somerville, N.J.

[21] Appl. No.: 150,173

[22] Filed: Jan. 29, 1988

Related U.S. Application Data

[62] Division of Ser. No. 918,284, Oct. 10, 1986, Pat. No. 4,776,999.

[51] Int. Cl.$^4$ .............................................. B29C 41/12
[52] U.S. Cl. ..................................... 428/333; 264/41; 264/298; 428/220; 524/465
[58] Field of Search .................. 264/41, 298; 428/220, 428/333; 210/500.38, 500.41; 524/465

[56] References Cited

U.S. PATENT DOCUMENTS

| | | | |
|---|---|---|---|
| 3,892,665 | 7/1975 | Steigelmann et al. | 210/500.38 |
| 4,155,793 | 5/1979 | Salemme et al. | 264/298 |
| 4,163,725 | 8/1979 | Sano et al. | 210/500.41 |
| 4,279,855 | 7/1981 | Ward, III | 264/298 |
| 4,444,662 | 4/1984 | Conover | 210/500.36 |
| 4,520,044 | 5/1985 | Sundet | 210/500.41 |

*Primary Examiner*—Allan M. Lieberman
*Attorney, Agent, or Firm*—Lynch, Cox, Gilman & Mahan

[57] ABSTRACT

Disclosed herein are free-standing, pinhole-free, ultrathin polyether sulfone films having thicknesses of about 400 angstroms or less and a process for preparing them. The films find particular utility in separatory applications.

17 Claims, No Drawings

ULTRATHIN POLYETHER SULFONE FILMS AND THEIR PREPARATION

STATEMENT AS TO RIGHTS TO INVENTIONS MADE UNDER FEDERALLY SPONSORED RESEARCH AND DEVELOPMENT

This invention was made with Government support under Contract Number DAAK 20-84-C0147 awarded by the Department of Defense (DOD). The Government has certain rights in this invention.

CROSS REFERENCE TO RELATED APPLICATIONS

This is a divisional of application Ser. No. 918,284 filed on Oct. 10, 1986, now U.S. Pat. No. 4,776,999.

BACKGROUND OF INVENTION

1. Field of Invention

This invention relates to polymer films. More particularly, this invention relates to ultrathin polyether sulfone polymer films and their production.

2. Prior Art

The preparation of various polymer films on a liquid support, such as water, is known. For example, U.S. Pat. No. 2,760,233 discloses a process for preparing curved sheets of synthetic resins by floating monomeric or prepolymeric synthetic resins on a liquid surface. Among the numerous resins listed as being suitable in the patent's process are polysulfones. However, no film thicknesses are disclosed.

In U.S. Pat. No. 4,008,203 and British Pat. No. 1,016,245, polyether sulfone films are disclosed. However, no film thicknesses are described.

In U.S. Pat. No. 4,108,837, polyether sulfone films having thicknesses of 1.0 mil or more are disclosed. However, the films are not ultrathin.

In U.S. Pat. No. 3,933,561 a process for manufacturing polymer films on a liquid surface is disclosed. Films with a thickness of less than one micron, for example, 0.1 microns (i.e. 1,000 angstroms), are reportedly prepared by the patent's process. The preferred class of polymers is polysulfones. However, suitable chlorinated solvents for preparing ultrathin, pinhole-free, polyether sulfone films having thicknesses of 400 angstroms or less are not specifically disclosed.

U.S. Pat. No. 3,551,244 discloses a process for preparing on a water surface films having a thickness between 0.05 and 5.0 microns (i.e. between 500 and 50,000 angstroms). The patent lists certain halogenated solvents, such as chloroform, as suitable solvents and states that polysulfone films can be made. However, suitable chlorinated solvents for casting pinhole-free, polyether sulfone films are not specifically disclosed.

U.S. Pat. No. 3,767,737 discloses a method for producing on a support liquid nonporous polymer membranes having thicknesses between 0.005 and 0.05 mils. Any polymer or copolymer capable of being cast as a film from solvents is allegedly suitable for use in the patent's process. However, polyether sulfone is not listed as one of the typically suitable polymers and appropriate chlorinated solvents for preparing pinhole-free, polyether sulfone films are not specifically disclosed.

U.S. Pat. Nos. 4,155,793, 4,279,855 and 4,374,891 disclose processes for preparing substantially void-free, ultrathin, permeable polymeric membranes of 500 angstroms or less. Natural or synthetic polymers are allegedly suitable for use in the patent's process. However, only films prepared from organopolysiloxane polycarbonate interpolymers mixed with polyphenylene oxide are disclosed in the examples. Polyether sulfone films are not disclosed.

Other patents, such as U.S. Pat. Nos. 2,631,334, 2,689,187, and 4,393,113 also disclose ultrathin polymeric films. However, no polyether sulfone films are disclosed.

In the prior art, the preparation of ultrathin, pinhole-free, polyether sulfone, free-standing films with thicknesses of less than 400 angstroms generally has not been disclosed. Usually, prior art polymer films with thicknesses of less than 400 angstroms that are cast contain holes or other macroscopic defects.

Accordingly, it is an object of this invention to prepare ultrathin, polyether sulfone polymer films.

It is a further object of this invention to prepare pinhole-free, polyether sulfone polymeric films.

It is also an object of this invention to prepare free-standing, polyether sulfone films having thicknesses of 400 angstroms or less.

These and other objects are obtained by the products and process of the present invention.

SUMMARY OF INVENTION

The instant invention provides a process for preparing macroscopically pinhole-free, ultrathin, polyether sulfone films having thicknesses of about 400 angstroms or less. The films are prepared by dissolving a polyether sulfone polymer in 1,2,3-trichloropropane or 1,1,2,2-tetrachloroethane to form a polymeric solution, casting the solution on water to form a free-standing film, and removing the film from the water. The ultrathin films of the present invention can be used in separatory applications and as drug release membranes to facilitate the controlled release of drugs.

DETAILED DESCRIPTION OF INVENTION

The preparation of polyether sulfones is well known. Generally, polyether sulfones are prepared by the ferric chloride-catalysed polycondensation of monosulphonyl or disulphonyl chlorides. Suitable polyether sulfones and their preparation are disclosed in "Synthesis of Poly(arylene sulphones) by Polycondensation of Arylsulphonyl Chlorides under Friedel-Crafts Conditions" by Cudby, et. al., *Polymer* 6, 589 (1965), "Structures of the Poly(diphenylene ether sulphones) Obtained by Polysulphonylation," by Cudby et. al., *Polymer* 9, 265 (1965), British Pat. No. 1,016,245 and U.S. Pat. Nos. 4,008,203, 4,105,636 and 4,108,837, all of which are incorporated herein by reference.

The preferred polyether sulfones have the recurring units shown in formulas I or II:

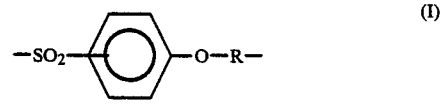

wherein R is

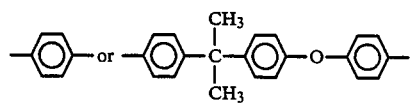

and the SO₂ group is in the ortho, meta or para position on the ring, or

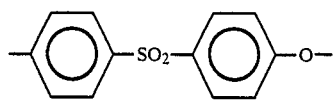 (II)

The polyether sulfone polymers that can be cast as macroscopically pinhole-free, ultrathin films preferably have molecular weights in the range of about 5,000 to about 100,000 and most preferably about 20,000 to about 50,000.

The most preferred polyether sulfone polymer has the repeating unit shown in formula II and can be prepared by nucleophilic substitution of an aromatically bound halogen by phenoxy ions according to the following reaction:

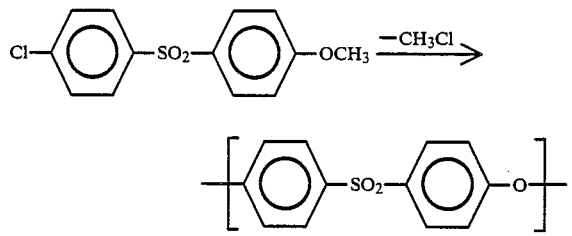

The most preferred polymer may also be prepared by a nucleophilic substitution in the following copper-catalysed reaction:

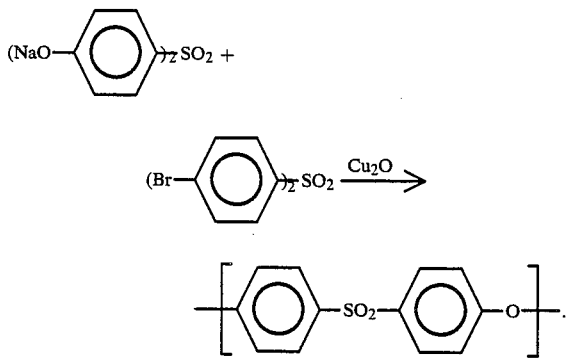

The most preferred polymer is commercially available from Imperial Chemical Industry under the tradename "Victrex PES 5200G".

In order to prepare a polymer casting solution, the polyether sulfone polymer is dissolved in a chlorinated solvent, preferably 1,2,3-trichloropropane or 1,1,2,2-tetrachloroethane. The casting solution is prepared by stirring the polymer and solvent at a temperature of less than 100° C. (eg. 60° C.) for several hours (eg. three to seven hours). The casting solution should contain about two to about twelve percent by weight of the polymer based upon the total weight of the casting solution, preferably about four to about eight percent, and most preferably about six to about seven percent. Generally, the greater the amount of polymer in the casting solution, the thicker the films that are prepared. Conversely, the lower the amount of polymer, the thinner the films will be. However, if the amount of polymer is too low, such as one percent by weight or less, the film will be too fragile to lift from the casting surface. It is preferred to employ the polymer solution immediately after preparation because, upon standing for a few days, the solution tends to gel.

Cast polyether sulfone films can also be prepared from a mixed polymer casting solution containing a polyether sulfone polymer and a minor amount of other polymers which are compatible in film form with the polyether sulfone and which can be dissolved in the casting solution. When other polymers are added to the casting solution, the amount of polyether sulfone employed should be 80 percent or more by weight based upon the total weight of polymers dissolved in the polymeric casting solution.

Before the polymeric solution is cast into films, it is preferred to filter the solution using microfilters and/or membranes. Filtration of the polymer solution before casting substantially reduces imperfections, such as spots and pinholes, in the cast films. The solution can be suction filtered through glass microfiber filters and then passed through one or more membranes having pores with diameters of about one to three microns. These filters are available from the Millipore Corporation. For example, it is preferred to pass the solution through a series of Millipore membranes, the first membrane having a pore size of 3.0 microns, the second of 1.0 micron and the last of 0.45 micron. In order to enable the solution to pass through the smaller pore size membranes, it is usually necessary to apply pressure. For example, a Millipore stainless 47 mm pressure holder operated at a pressure up to 100 psi argon can be used. The amount of pressure applied will depend upon the viscosity of the solution and the pore size of the membrane. Enough pressure to force the solution through the membrane is needed.

After filtration, the solution is cast on water at or near room temperature. As used therein, the term "water" includes aqueous solutions containing minor amounts (e.g., one percent or less by weight based upon the total weight of the solution) or organic solvents (e.g., lower weight alcohols) the presence of which does not adversely affect the properties of the films cast on the solution. The addition of such organic solvents may facilitate the removal of the film from the water's surface. The water is contained in any suitable walled container. For example, an appropriate container is an aluminum container having dimensions of 12"×12"×3". Preferably, the walls of the container are sloped outwardly at about a 20 degree incline to reduce reflected surface waves which can damage the film. Such waves are produced when the polymeric solution is placed on the water's surface or by air currents and external vibrations. Most preferably, the inside walls of the container are teflon coated so that films are less likely to stick to the sides of the container.

The polymeric solution is cast by depositing a drop of the polymer solution upon the water's surface. The solution usually spreads over the surface of the water in three seconds or less. The solution is allowed to stand until a sufficient amount of the solvent has evaporated to form a free-standing film. As used herein, the term "free-standing film" refers to a film that has a physically stable shape and is dimensionally stable on its casting surface and can be removed from the casting surface without having to be supported over the entire surface area of the film. The time of evaporation generally is between 20 and 30 seconds and rarely more than about 60 seconds.

After the solvent has evaporated, the film is lifted from the liquid surface using any suitable means, such as a 2"×3", thin, aluminum plate having a 30 millimeter inner diameter hole in it and a handle on one end of the plate. When the aluminum plate touches the surface of the film, the film adheres to the aluminum plate and may readily be removed from the surface of the water.

The films of the instant invention are generally round, ultrathin, pinhole-free and uniform and have a thickness of about 400 angstroms or less, usually about 100 to about 180 angstroms. As used herein, the term "ultrathin film" refers to a film having a thickness of 400 angstroms or less, and the term "pinhole-free film" refers to a film having no macroscopic holes.

The films of this invention can be used as gas separation membranes and in end uses where a controlled release of drugs is needed.

The invention is illustrated by the following examples in which are percentages are by weight unless otherwise specified.

EXAMPLE 1

A polymer solution containing seven percent by weight polyether sulfone dissolved in 1,2,3-trichloropropane was prepared by magnetically stirring the solvent and the polymer for five hours at 60° C. The polyether sulfone polymer was Victrex PES 5200G which is available from Imperial Chemical Industries. Victrex PES 5200G is a high viscosity, amorphous, polyether sulfone having a Tg of 230° C., a flexural modulus of $3.7 \times 10^5$ psi at 20° C., a tensile strength of $1.22 \times 10^4$ psi at 20° C. and a repeating unit of:

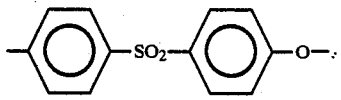

After the polymer was dissolved in the solvent, the polymer solution was filtered through three microfiltration membranes obtained from the Millipore Corporation. A Millipore stainless 47 millimeter pressure holder operated at a pressure sufficient to force the solution through the membranes was employed. The first and second membranes had pore sizes of 3.0 microns and 1.0 micron, respectively, and were Fluoropore polytetrafluoroethylene membranes. The third membrane was a Durapore polyvinylidene fluoride membrane and had a 0.45 micron pore size. After filtration, a drop of the polymer solution was deposited on water contained in a square aluminum container measuring 12"×12"×3" and having teflon coated walls which were sloped away from the center at a 20 degree incline. The drop spread rapidly over the surface of the water to form a film having a diameter of about five inches. After 30 seconds, the film was lifted from the surface of the water using a 2"×3" aluminum plate having a 30 mm diameter hole in the middle and a handle attached at one end. The film was colorless and had a thickness of about 180 angstroms. There were no macroscopic pinholes in the film.

EXAMPLE 2

Example 1 was repeated except that the polymer casting solution contained about five percent by weight polyether sulfone. The film had a thickness of about 130 angstroms and contained no pinholes observable to the eye.

EXAMPLE 3

Example 1 was repeated except that the polymer was dissolved in 1,1,2,2-tetrachloroethane. The film contained no macroscopic pinholes.

As can be seen, both 1,2,3-trichloropropane and 1,1,2,2-tetrachloroethane are suitable solvents from which ultrathin, pinhole-free polyether sulfone films may be prepared.

What is claimed is:

1. A polyether sulfone free-standing polymer film containing no macroscopic holes and having a thickness of about 180 angstroms or less and randomly oriented molecules.

2. The film of claim 1 wherein the film is prepared from polyether sulfone polymers having repeating units of the formula:

where R is

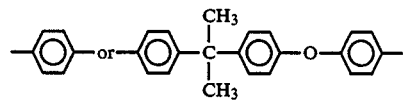

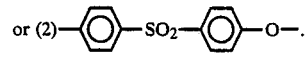

3. The film of claim 1 wherein the film is prepared from a polyether sulfone polymer having the general formula:

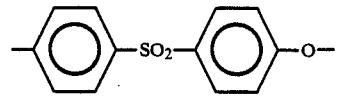

4. The film of claims 1, 2 or 3 wherein the polyether sulfone polymer has a molecular weight, $M_w$, in the range of about 5,000 to about 100,000.

5. The film of claim 4 wherein the molecular weight, $M_w$, is in the range of about 20,000 to about 50,000.

6. The film of claims 1, 2 or 3 wherein the film has a thickness in the range of about 100 to about 180 angstroms.

7. The film of claims 1, 2 or 3 wherein the film is prepared from a casting solution containing a polyether sulfone polymer at about the 80 to about the 100 percent by weight level and another polymer or polymers at about the 20 to about the 0 percent by weight level based upon the total weight of the polymers dissolved in the casting solution.

8. A polyether sulfone film containing no macroscopic holes and having a thickness of about 400 angstroms or less and randomly oriented molecules prepared according to the process comprising:
 (a) preparing a casting solution containing a polyether sulfone polymer at about the two to about the twelve percent by weight level, based on the total weight of the casting solution, in 1,2,3-trichloropropane or 1,1,2,2-tetrachloroethane;

(b) depositing the casting solution on water to form a free-standing film; and (c) removing the film from the water.

9. A polyether sulfone film containing no macroscopic holes and having a thickness of about 400 angstroms or less and randomly oriented molecules prepared according to the process comprising:

(a) preparing a casting solution containing a polyether sulfone polymer having the repeating formula:

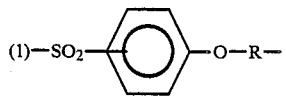

present at about the two or about the twelve percent by weight level, based upon the total weight of the casting solution, in 1,2,3-trichloropropane or 1,1,2,2-tetrachloroethane;

(b) depositing the casting solution on water to form a free-standing film; and (c) removing the film from the water.

10. The film of claim 8 wherein the polyether sulfone polymer has the repeating formula:

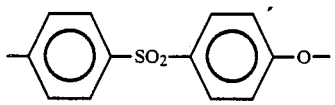

wherein R is

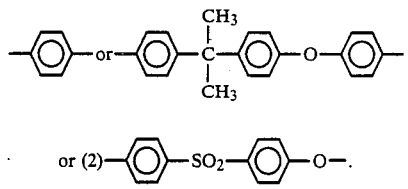

or (2) 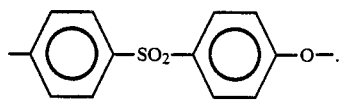

11. The film of claim 8 wherein the polymer has the repeating formula:

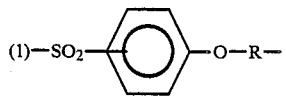

12. The film of claim 8, 9, 10 or 11 wherein the polyether sulfone polymer is present at about the four to about the eight percent by weight level in the casting solution based upon the total weight of the casting solution.

13. The film of claim 12 wherein the polymer is present at about the six to about the seven percent by weight level.

14. The film of claim 8 or 9 wherein the polyether sulfone polymer has a molecular weight, $M_w$, in the range of about 5,000 to about 100,000.

15. The film of claim 14 wherein the molecular weight, $M_w$, is in the range of about 20,000 to 50,000.

16. The film of claim 8 or 9 wherein the casting solution contains a polyether sulfone polymer at about the 80 to about the 100 percent by weight level and another polymer or polymers at about the 20 to about the 0 percent by weight level based upon the total weight of the polymers dissolved in the casting solution.

17. The film of claim 8 or 9 wherein the film has a thickness in the range of about 100 to about 180 angstroms.

* * * * *